(12) United States Patent
Kumar

(10) Patent No.: US 12,328,679 B2
(45) Date of Patent: Jun. 10, 2025

(54) DYNAMIC POWER CLASS ASSIGNMENTS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/583,160

(22) Filed: Jan. 24, 2022

(65) Prior Publication Data
US 2023/0239802 A1    Jul. 27, 2023

(51) Int. Cl.
| | | |
|---|---|---|
| *H04W 52/00* | (2009.01) | |
| *H04W 24/10* | (2009.01) | |
| *H04W 52/14* | (2009.01) | |
| *H04W 52/28* | (2009.01) | |
| *H04W 52/36* | (2009.01) | |

(52) U.S. Cl.
CPC ......... *H04W 52/146* (2013.01); *H04W 24/10* (2013.01); *H04W 52/281* (2013.01); *H04W 52/367* (2013.01)

(58) Field of Classification Search
CPC ............. H04W 52/146; H04W 52/281; H04W 52/367; H04W 24/10
See application file for complete search history.

(56) References Cited

U.S. PATENT DOCUMENTS

| | | | |
|---|---|---|---|
| 11,375,461 B1 * | 6/2022 | Kumar | ................ H04W 52/367 |
| 2006/0264182 A1 | 11/2006 | Morioka | |
| 2020/0205062 A1 | 6/2020 | Azizi et al. | |
| 2021/0400599 A1 * | 12/2021 | Gopal | ................... H04W 52/16 |

FOREIGN PATENT DOCUMENTS

WO    WO-2021194916 A1 *    9/2021

OTHER PUBLICATIONS

International Search Report and Written Opinion dated Mar. 14, 2023 from corresponding PCT Application No. PCT/US2022/080507.

* cited by examiner

*Primary Examiner* — Erika A Washington
(74) *Attorney, Agent, or Firm* — ArentFox Schiff LLP

(57) ABSTRACT

Aspects of the disclosure provide methods and apparatus for dynamically assigning signal paths to multiple subscriptions in a user equipment (UE) that supports dual subscription dual active (DSDA) communications. The dynamic assignment of signal paths provide dynamic implementation of power classes for uplink transmissions based on communication parameters of the networks associated with the dual subscriptions.

27 Claims, 8 Drawing Sheets

DYNAMIC POWER CLASS ASSIGNMENTS

BACKGROUND

Technical Field

The present disclosure generally relates to communication systems, and more particularly, to dynamic power class assignments in wireless communication devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. In an aspect of the disclosure, a method, a computer-readable medium, and an apparatus are provided.

Certain aspects are directed to a method of wireless communication at a user equipment (UE). In some examples, the method includes determining one or more communication parameters associated with one or more of a first subscription or a second subscription, the first subscription enabling wireless communications between the UE and a first network, the second subscription enabling wireless communications between the UE and a second network. In some examples, the method includes assigning one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power.

Certain aspects are directed to an apparatus for wireless communications. In some examples, the apparatus includes a memory comprising instructions, and one or more processors configured to execute the instructions. In some examples, the one or more processors are configured to cause the apparatus to determine one or more communication parameters associated with one or more of a first subscription or a second subscription, the first subscription enabling wireless communications between the apparatus and a first network, the second subscription enabling wireless communications between the apparatus and a second network. In some examples, the one or more processors are configured to cause the apparatus to assign one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power.

Certain aspects are directed to a non-transitory computer-readable medium having instructions stored thereon that, when executed by a user equipment (UE), cause the UE to perform operations. In some examples, the operations include determining one or more communication parameters associated with one or more of a first subscription or a second subscription, the first subscription enabling wireless communications between the UE and a first network, the second subscription enabling wireless communications between the UE and a second network. In some examples, the operations include assigning one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power.

Certain aspects are directed to an apparatus for wireless communication. In some examples, the apparatus includes means for determining one or more communication parameters associated with one or more of a first subscription or a second subscription, the first subscription enabling wireless communications between the apparatus and a first network, the second subscription enabling wireless communications between the apparatus and a second network. In some examples, the apparatus includes means for assigning one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
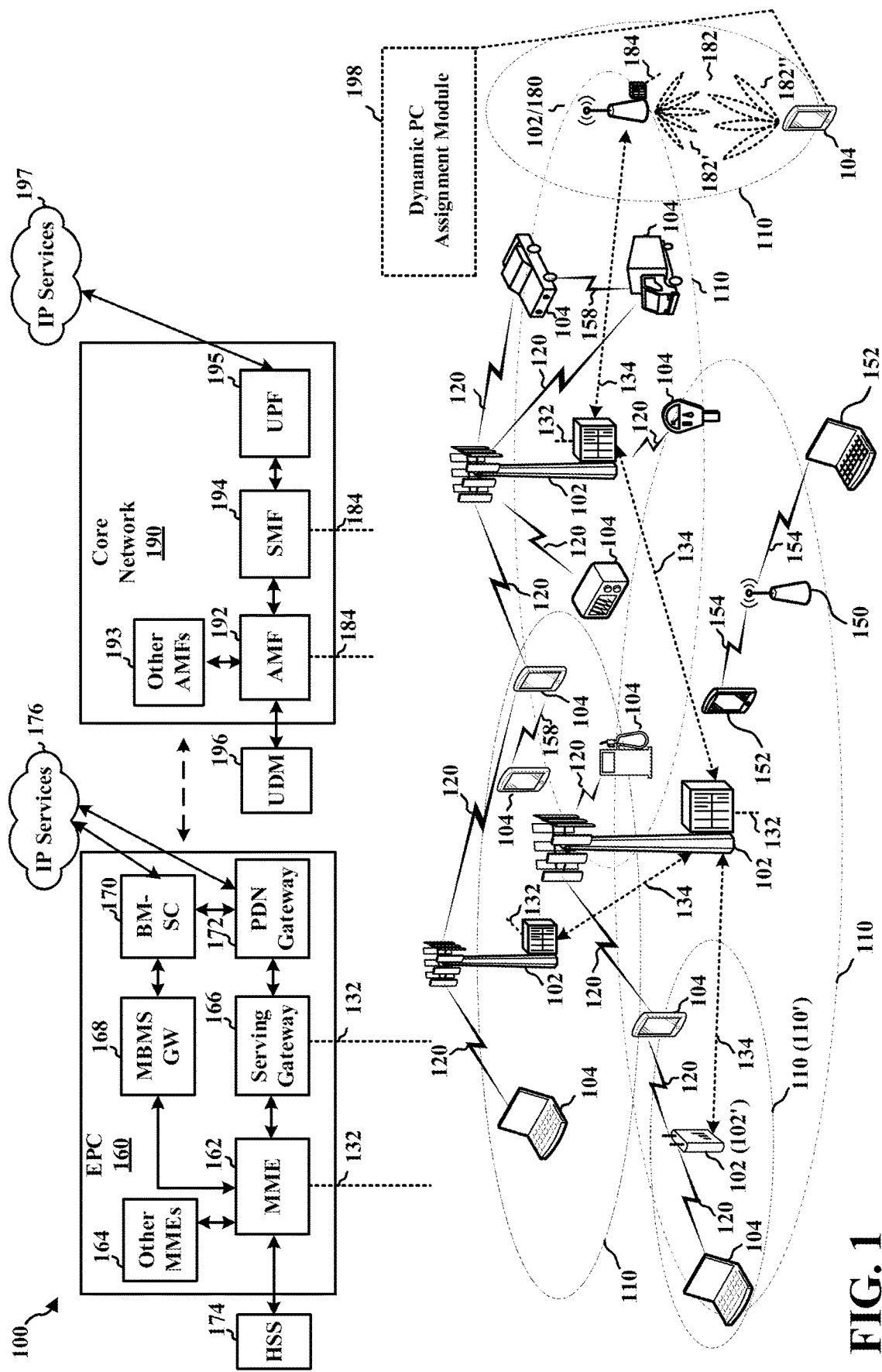
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless devices, such as user equipment (UEs), may transmit uplink signaling in one or more power class (PC) modes. As per relevant standards, a PC mode relates to a maximum transmit power over a particular channel bandwidth. For example, a UE may transmit uplink signaling in a PC3 mode, wherein the uplink signaling may be transmitted at a maximum uplink transmit power of 23 dBm in all operating bands within frequency-range 1 (FR1). Alternatively, the UE may transmit uplink signaling in a PC2 mode, wherein the uplink signaling may be transmitted at a maximum uplink transmit power of 26 dBm for certain operating bands within FR1. In some examples, the UE may support PC1.5 mode, having a maximum uplink transmit power of 29 dBm in certain operating bands. However, for a UE to support the relatively high uplink transmit power associated with PC2 and PC1.5 modes, the UE requires hardware (e.g., a radio frequency (RF) front end) configured to support the higher transmit power. Such hardware is more costly than, for example, hardware configured to support transmit power associated with PC3. An RF front end may include various hardware and integrated circuit (IC) elements that support wireless communication signaling. For example, the RF front end may include RF amplifiers, demodulators, mixers, and antenna.

In some examples, UEs may be configured with multi-subscriber identification module (SIM) capabilities. Such capabilities have become increasing popular because of the versatility that they provide, particularly in countries where there are many service providers. For example, dual-SIM wireless devices may allow a user to implement two different plans or service providers, with separate numbers and bills, on the same device (e.g., business account and personal account). Also, during travel, users can obtain local SIM cards and pay local call rates in the destination country.

In some examples, a UE may be configured as a dual-SIM dual active (DSDA) device, which provides the UE with simultaneous active connections with the networks corresponding to two SIMs using separate transmit/receive paths associated with each SIM. That is, the UE may include hardware (e.g., a radio frequency (RF) front end) configured to support multiple signal paths, with each signal path used by a particular one of the two SIMS.

However, due to the relatively high costs of RF front end circuitry configured to support signal paths that can operate in high-powered modes (e.g., PC1.5 and/or PC2), a UE may be manufactured with only one of the multiple signal paths supporting a PC1.5 or PC2 mode, while the remaining signal path(s) may support PC3. Thus, while a UE may support multiple SIMS, only one of the SIMs can use the signal path configured for the PC1.5 or PC2 mode. Moreover, a user may be limited to configuring the signal path to only one SIM, such that the signal path configured for the PC1.5 or PC2 mode is statically assigned to the one SIM.

Thus, certain aspects of the disclosure relate to techniques for dynamically assigning a high-powered signal path (e.g., a signal path that supports configured PC1.5 or PC2 modes) to multiple SIMS. For example, the UE may dynamically assign the high-powered signal path to a particular SIM based on certain criteria to ensure that the high-powered signal path is used by the SIM that is most capable of taking advantage of the relatively high-powered uplink transmission capability. In some examples, the criteria may include one or more of network configuration and network support, radio conditions, SIM/subscription state, and/or other safety constraints and communication metrics (e.g., co-existence requirements, specific absorption rate (SAR) constraint, maximum transmit power level (MTPL), thermal constraint/requirement (e.g., temperature of the UE and/or a component of the UE that may affect uplink transmit power), battery level and/or battery functionality as determined by diagnostics, and/or any other constraint/requirement of the UE or component of the UE that may limit uplink transmit power of the UE).

For example, the UE may be configured with a diagnostic component configured to collect information associated with various other components of the UE (e.g., temperature sensors, battery sensors, hardware sensors, etc.), and respond to the information if the information triggers a safety constraint (e.g., operational configuration of the UE associated with a thermal constraint, a battery constraint, a hardware constraint, etc.). In certain aspects, the UE may reduce uplink transmit power if the diagnostic component determines that the collected information is indicative of a potential safety hazard or operational hazard. For example, if the temperature of an RF component increases to a threshold level, a thermal constraint may be triggered. In response, the UE may reduce uplink transmit power in order to help reduce the temperature. Similarly, if a temperature of the battery increases to a threshold level, a thermal constraint may be triggered. In response, the UE may reduce uplink transmit power in order to help reduce the temperature of the battery. In another example, if a power level of the battery drops below a threshold level, then an operational constraint may be triggered. In response, the UE may reduce uplink transmit power in order to help preserve battery power. In yet another example, if a temperature of a hardware component of the UE increases to a threshold level, a thermal/operational constraint may be triggered. In response, the UE may reduce uplink transmit power in order to help reduce the temperature of the component and/or prevent the component from operating at a certain level while at the relatively high temperature. It should be noted that the above are examples, and any configuration of the UE that may affect an uplink transmit power is also contemplated by this disclosure.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may be configured to communicate using multiple subscriptions, where each subscription can use a different subscription identity module (SIM) in each UE 104. In one example, a UE 104 can communicate using dual SIMS, where the SIMS can be internal to the UE 104 and/or on SIM cards inserted into a port or interface of the UE 104. In any case, the SIM can include subscription information for the UE 104 to use in communicating (e.g., cellular or other wireless communications) with one or more wireless networks. The UE 104 can be configured to communicate in a dual subscription dual standby (DSDS) mode, where the device can communicate using a first subscription while being in standby on a second subscription.

The UE 104 may also be configured to communicate in dual subscription dual active (DSDA) mode where the device can simultaneously transmit and receive communications using both subscriptions. Thus, certain UEs 104 may be configured for multi-SIMS where two subscriptions are active at the same time, and the two subscriptions are used for the same or different modes (e.g., data communications and/or voice communications). For example, a UE 104 may use a first SIM for transmitting and receiving data for gaming or streaming video, and simultaneously use a second SIM for voice. In another example, the UE 104 may use data or voice over both the first SIM and second SIM simultaneously.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP)

packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with a dynamic power class assignment module 198. In certain aspects, the module 198 may be configured to determine one or more communication parameters associated with one or more of a first subscription or a second subscription, the first subscription enabling wireless communications between the UE and a first network, the second subscription enabling wireless communications between the UE and a second network.

In certain aspects, the module 198 may be configured to assign one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power.

Figure 2:
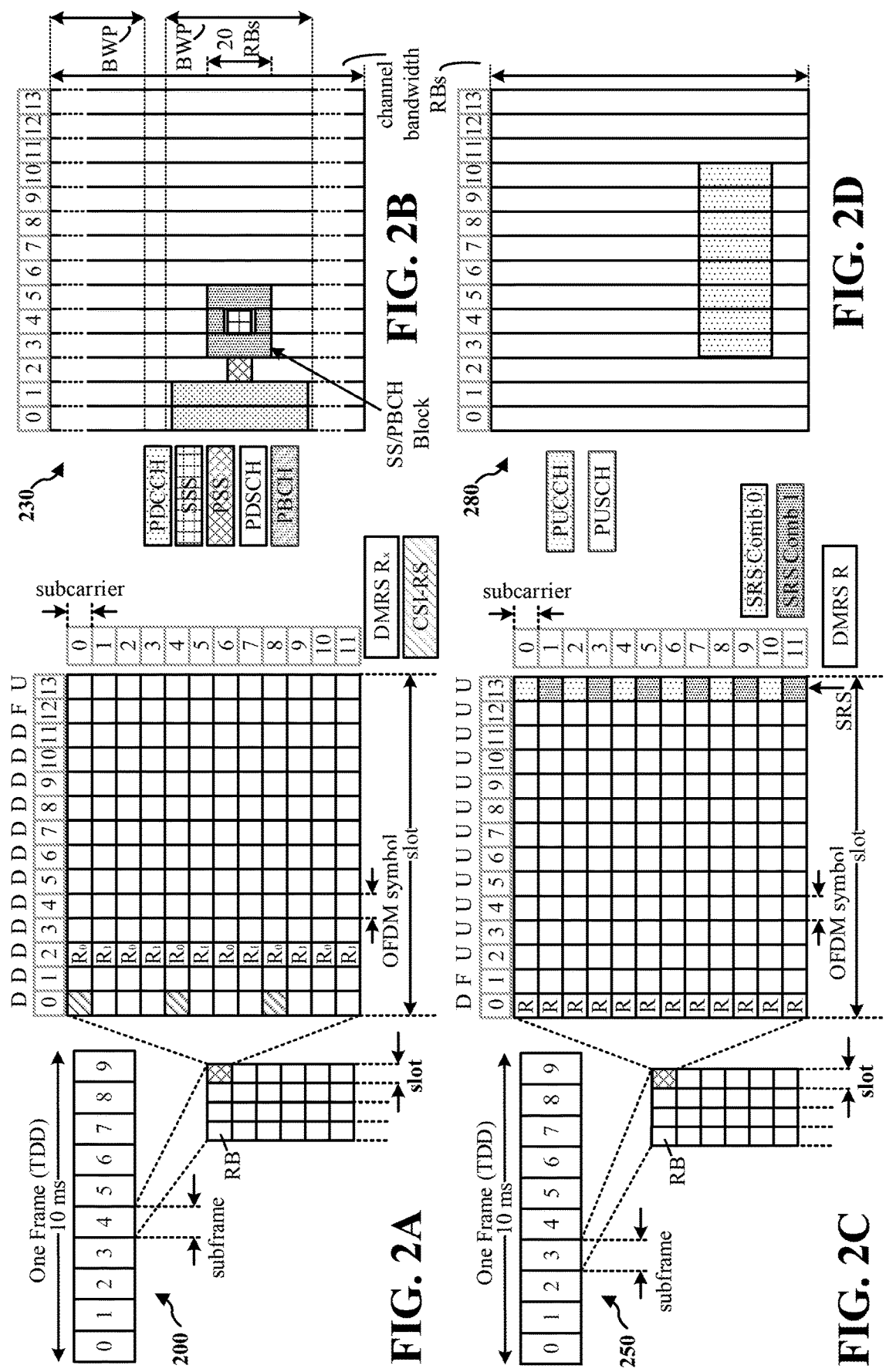
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
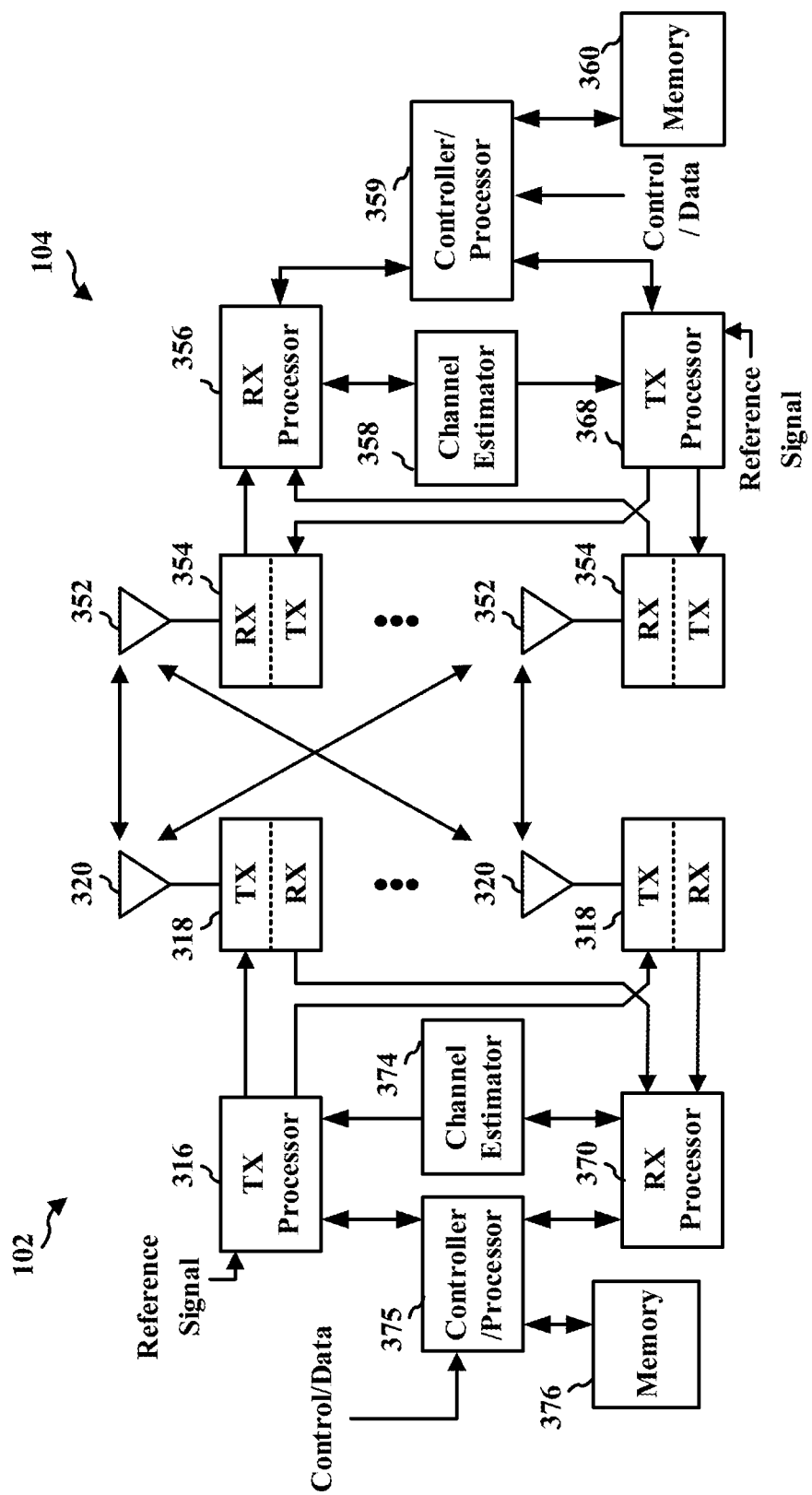
FIG. 3 is a diagram illustrating an example of a base station (BS) and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission. In some configurations, the RF front end of the UE 104 may include one or more of the antenna 352, the transmitters 354TX, the TX processor 368, the receivers 354RX, and the RX processor 356.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Example Techniques for Dynamic Assignment of Higher Power-Class Capable Signal Paths Among Multiple SIMs As discussed, a UE may be configured to communicate using multiple subscriptions, or SIMS associated with the UE. That is, the UE may be configured with communication hardware that supports multiple signal paths for separate transmit and receive functions for each SIM. However, as noted previously, only one of the multiple signal paths may be configured to support higher PCs (e.g., PC1.5 and/or PC2), while one or more other signal paths may only be capable of supporting PC3.

Thus, the following disclosure provides methods and techniques for dynamically assigning a signal path for communication (e.g., PC1.5 and/or PC2 capable signal paths) with different SIMs to optimize use of the signal path. For example, if a UE is unable or otherwise limited to a relatively low uplink transmit power for a particular subscription, the UE may determine to use a PC3 capable signal path for that subscription. Similarly, if a UE needs to use a relatively high uplink transmit power for a particular subscription, the UE may determine to use a PC2/PC1.5 capable signal path for that subscription. In some examples, the UE may dynamically switch from one signal path to another signal path during communication if a higher-powered signal path (e.g., PC2/PC1.5) is no longer required, or if a lower-powered signal path (e.g., PC3) will prevent the UE from transmitting uplink communications with the required amount of power. Accordingly, the UE's use of signal paths is optimized by using the higher-powered signal paths where necessary and reserving the higher-powered signal paths for another subscription if the higher transmit power levels are not necessary.

While certain aspects of the disclosure are discussed relative to certain embodiments defined by the figures below, all embodiments of the disclosure can include one or more other aspects discussed herein. In other words, while one or more embodiments may be discussed as having certain advantageous features, one or more of such features may also be used in accordance with the various other embodiments of the disclosure.

Figure 4:
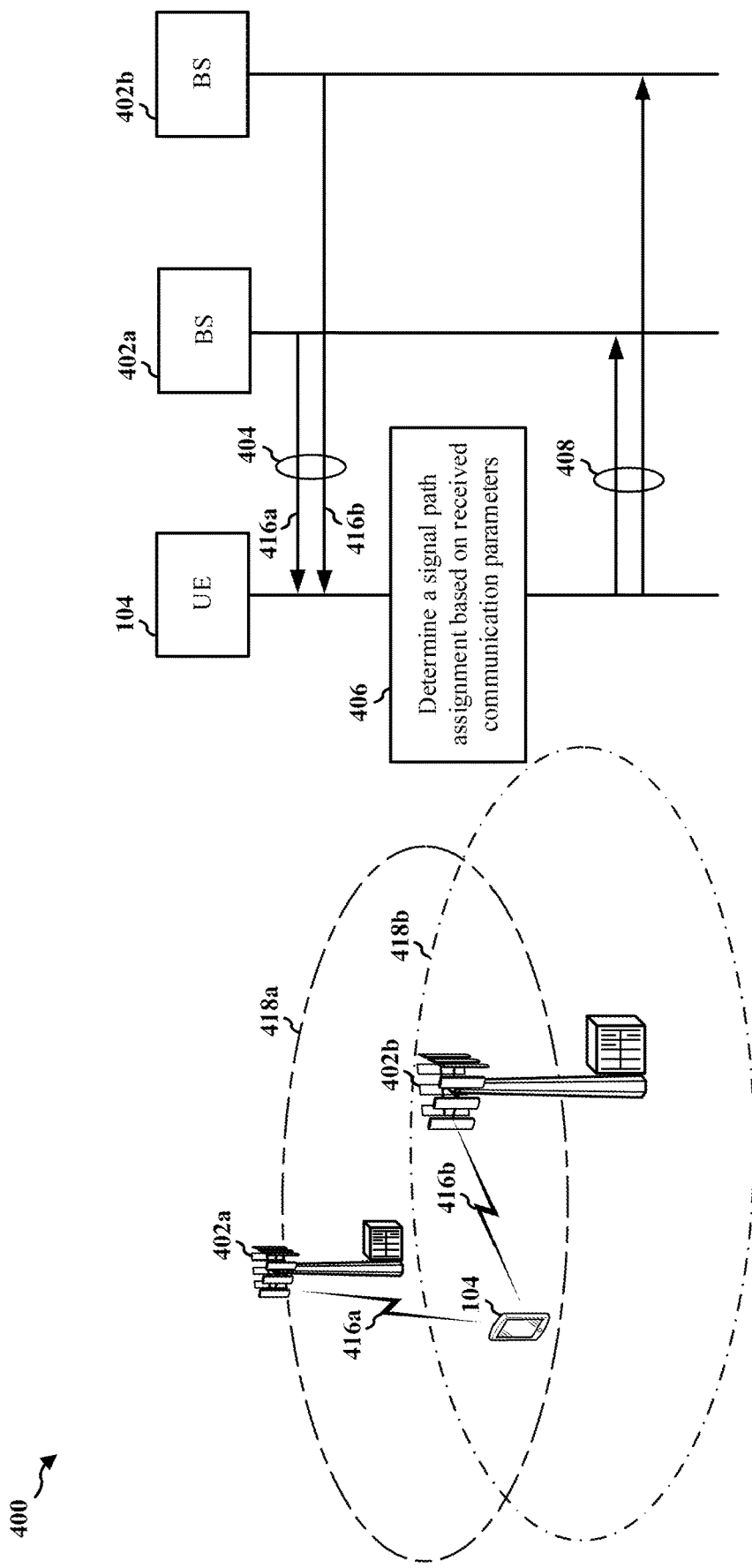
FIG. 4 is a call-flow diagram illustrating example communications between a multi-subscriber identification module (SIM) configured UE, and a first BS of a first network and a second BS of a second network.

FIG. 4 is a call-flow diagram illustrating example communications 400 between a multi-SIM UE (e.g., UE 104 of FIG. 1), and a first base station (BS) 402a of a first network 418a and a second BS 402b of a second network 418b (e.g., BSs 102 of FIG. 1). Based on the communications 400, the UE 104 may determine signal path assignment in accordance with some aspects of the present disclosure. In this example, the UE 104 may include: (i) a first SIM for a first subscription with a wireless service provided by the first BS 402a, and (ii) a second SIM for a second subscription with another wireless service provided by the second BS 402b. The UE 104 may communicate with the first BS 402a using an operating band of the first subscription 416a and may communicate with the second BS 402b using an operating band of the second subscription 416b. As such, while the UE 104 may include hardware that provides multiple signal paths for simultaneous communication with both the first BS 402a and the second BS 402b, only one of the signal paths may be configured to support a higher PC (e.g., PC2 and/or PC1.5).

In certain aspects, the UE 104 may use communication parameters advertised by the one or more of the first BS 402a and the second BS 402b to determine which subscription would be an optimal assignment to the higher PC signal path. For example, in a first set of downlink transmissions 404, one or more of the first BS 402a and the second BS 402b may advertise (e.g., via one or more of a system information block (SIB), master information block (MIB), etc.) the communication parameters to the UE 104.

The advertised communication parameters may include specific information elements (IEs) that may limit the uplink transmit power that the UE 104 is allowed to use in the first network 418a or the second network 418b. In one example, p-max may indicate a maximum uplink transmit power that the UE 104 can use on a certain operating band in the first network 418a or the second network 418b. In another example, p-NR-FR1 may indicate a maximum cumulative uplink transmit power the UE 104 can transmit on FR1 in the first network 418a or the second network 418b (e.g., if the UE 104 is transmitting on multiple beams). In yet another example, p-UE-FR1 may indicate a maximum uplink transmit power over FR1 for both LTE and NR. Thus, the UE 104 may use the advertised communication parameters to determine a maximum uplink transmit power that the UE 104 may use in communications in the corresponding first network 418a and/or second network 418b.

In some examples, the advertised communication parameters may include an indication of a bandwidth of an operating band that the UE 104 may use for uplink transmissions to the first BS 402a and/or the second BS 402b. Alternatively, or in addition, the first set of transmissions 404 may include transmissions that are made directly to the UE 104 via downlink signaling (e.g., control signaling, such as downlink control information (DCI)). For example, one or more of the first BS 402a or the second BS 402b may transmit an indication of a modulation order that the UE 104 may use for uplink transmissions.

In certain aspects, the UE 104 may use the indicated bandwidth, and/or the indicated modulation order to estimate an uplink transmit power that the UE 104 must use for communication with one or more of the first BS 402a or the second BS 402b. For example, based on the modulation order, the UE 104 may determine an uplink transmit power that allows the UE 104 to maintain a proper signal-to-noise ratio (SNR) to ensure the first BS 402a and/or the second BS 402b can decode the UE's 104 uplink signals. Thus, for example, if the first network uses a relatively high modulation order (e.g., an order or 4 or higher, such as quadrature phase-shift keying (QPSK), quadrature amplitude modulation (QAM), etc.), the UE 104 may be required to transmit uplink signals at a relatively higher power. Similarly, if the first BS 402a and/or the second BS 402b use a relatively wide operating bandwidth (e.g., 60 MHz or higher), the UE 104 may be required to increase its uplink transmission power to maintain a required power density expected by the network using the larger bandwidth. For example, as the number of resource blocks (RBs) used in the operating band increases, so too does the transmit power used by the UE for uplink transmission.

Accordingly, the UE 104 may receive, via the first set of transmissions 404, one or more communication parameters from the first BS 402a and/or the second BS 402b indicating a maximum uplink transmit power available to the UE 104, or an uplink power level appropriate, for uplink communications over the corresponding first network 418a and/or second network 418b.

At a first process 406, the UE 104 may determine, based on the communication parameters, which signal path to assign to the first BS 402a, and which signal path to assign to the second BS 402b. The UE 104 may include multiple signal paths, of which one or more may support a high PC (e.g., PC1.5 and/or PC2), while others may support a relatively lower PC3.

Initially, the UE 104 may determine whether the communication parameters of either of the first BS 402a and the second BS 402b prevent the UE 104 from using a maximum uplink transmit power substantially greater (e.g., ±2 dBm) than 23 dBm. For example, if the first BS 402a transmits a SIB indicating that the maximum uplink transmit power in the first network 418a is 23 dBm, then the first BS 402a may assign a PC3 signal path for uplink transmissions in the first network 418a because a signal path defined by a PC providing a higher transmit power is not needed. Thus, if the UE 104 only has one signal path that can support the maximum uplink transmit power of PC2 or PC1.5, the UE 104 reserve that signal path or assign it to the second network 418b. It should be noted that the threshold values for uplink transmit power described herein are examples. As such, any suitable threshold values may be used with the techniques described.

For example, if the communication parameters of the second network 418b indicate that the maximum uplink transmit power in the second network 418b is 26 dBm, and/or the modulation order or bandwidth of the operating band require the UE 104 to use an uplink transmit power greater than 25 dBm, then the UE 104 may assign a PC2 or PC1.5 capable signal path to be used in the second network 418b. As such, the UE 104 may dynamically assign a PC2 or PC1.5 capable signal path to different networks associated with different SIMs so that the relatively higher power capability of the PC2 or PC1.5 signal path can be applied where it is most likely to be used.

Moreover, the UE 104 may monitor the first network 418a and second network 418b to determine if any changes to the communication parameters will affect the maximum uplink transmit power of the UE 104 in that network. For example, if second BS 402b indicates that the maximum uplink transmit power of the UE 104 will be reduced in the second network 418b to less than 25 dBm, the UE 104 may switch from the PC2/PC1.5 capable signal path to a PC3 signal path for uplink communications in the second network 418b. Similarly, if the first BS 402a indicates that the maximum uplink transmit power of the UE 104 will be increased in the first network 418a to greater than 25 dBm, the UE 104 may switch from the PC3 capable signal path to a PC2/PC1.5 capable signal path.

In a first set of uplink transmissions 408, the UE 104 may communicate with one or more of the first BS 402a or the second BS 402b using a corresponding signal path determined by the UE 104 at the first process 406 based on the received communication parameters.

Figure 5:
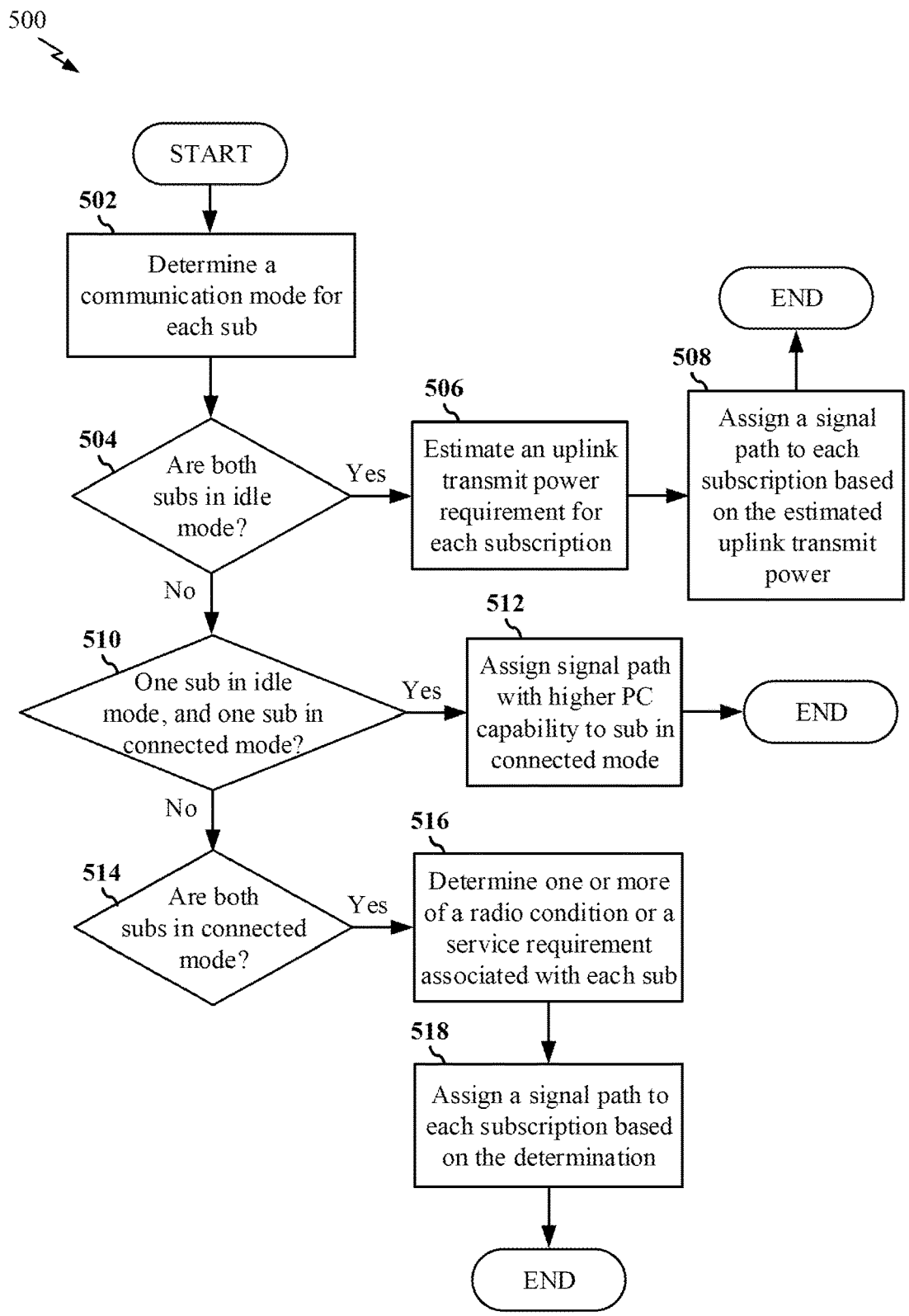
FIG. 5 is a flow chart illustrating an exemplary process for signal path assignment in accordance with some aspects of the present disclosure.

FIG. 5 is a flow chart illustrating an exemplary process 500 for signal path assignment in accordance with some aspects of the present disclosure. The process 500 may be performed by a UE (e.g., UE 104 of FIG. 1) configured with communication hardware that supports multiple signal paths for separate transmit and receive functions for each SIM/subscription. In the example, of FIG. 5, the UE may assign a signal path based on determined communication parameters for each subscription. Here, the communication parameters may include those discussed above in FIG. 4, as well as other communication parameters such as a communication mode, a service requirement (e.g., QoS requirements of communications), an application or a service type, etc., described in more detail below.

At a first step 502, the UE may determine a communication mode for each SIM/subscription supported by the UE. For example, the UE may determine whether each subscription is currently in a "connection mode" or an "idle mode." For example, a connection mode may be defined by one or more states (e.g., RRC_IDLE, RRC_CONNECTED, RRC_CONNECTED_INACTIVE, etc.), and/or a state wherein a radio resource control (RRC) connection exists between a subscription of the UE and a BS (e.g., BS 102 of FIG. 1). An idle mode, or inactive mode, may be defined by a subscription of a UE that has been put into an inactive state by a BS, and/or a state wherein the subscription has not yet registered with a network or is switched off.

At a second step 504, the UE may determine whether both a first subscription and a second subscription are in idle mode. If yes, the process 500 proceeds to a third step 506, wherein the UE estimates a potential uplink transmit power requirement for each subscription using current radio conditions. For example, the UE may measure downlink conditions such as signal level (e.g., measured reference signal received power (RSRP)), signal quality (e.g., reference signal received quality (RSRQ)), and/or path loss based on any suitable signaling (e.g., a path-loss reference signal (PLRS), a synchronization signal block (SSB), a physical broadcast channel (PBCH), etc.). The UE may use the measured downlink conditions to compute an expected transmit power for each subscription. If a subscription changes from idle mode to connected mode, the UE may determine a potential uplink transmit power requirement for communications over the subscription using the communication parameters described above in referenced to FIG. 4 to determine whether to assign a PC3 or PC2/PC1.5 capable signal path to the subscription.

At a fourth step 508, the UE may assign a signal path to each subscription based on the estimated uplink transmit power. For example, the UE may determine, based on radio conditions, that a potential transmission power for an uplink communication with a first BS corresponding to a first subscription would be no more than 25 dBm, while a potential transmission power for an uplink communication with a second BS corresponding to a second subscription would be more than 25 dBm. In this example, the UE may assign a PC2/PC1.5 signal path to the second subscription so that if the UE enters a connected mode with the second subscription, the signal path will be capable of handling uplink transmissions according to the potential power required for communication with the second BS. Similarly, the UE may assign a PC3 capable signal path to the first subscription if the UE enters a connected mode with the first subscription, because the UE will likely not require the relatively higher power capability of a PC2/PC1.5 signal path for uplink transmissions to the first BS.

It should be noted that if the UE estimates that a potential transmission power for an uplink communication with both the first BS and the second BS are greater than 25 dBm, the UE may assign a PC2/PC1.5 signal path to both the first subscription and the second subscription if the UE has more than one signal path that can support PC2/PC1.5.

At a fifth step 510, the UE may determine that a first subscription is in idle mode and a second subscription is in connected mode. In this example, at a sixth step 512, the UE may assign the PC2/PC1.5 signal path to the second subscription because the second subscription is the only subscription in a connected state, and therefore, is more likely to the higher transmit power capability of the PC2/PC1.5 signal path.

At a seventh step 514, the UE may determine that both a first subscription and a second subscription are in connected mode. The UE may then advance to an eighth step 516, where it determines one or more of a radio condition or a service requirement associated with each sub.

In one example, the UE may measure downlink conditions such as signal level for each of the subscriptions, and estimate the uplink transmit power required for each subscription using the techniques described above in the third step 506. At a ninth step 518, the UE may then assign the PC2/PC1.5 capable signal path to a subscription that requires the highest transmit power according to the estimations.

In another example, the UE, at the ninth step 518, may assign a signal paths to each of the subscriptions based on priority and/or quality of service (QoS) requirements of each of the subscriptions. For example, one or more of the first subscription or the second subscription may be used for communicating data characterized as mission critical (MiCr) data. In some configurations, MiCr data refers to data that has a relatively low or ultra-low latency requirement. For example, the latency requirement of MiCr data may be lower than the latency requirement of other data. Generally, latency refers to the delay associated with receipt of data at its intended destination. That is, data having a relatively low latency requirement may have less tolerance for delay than other data. In some configurations, MiCr data refers to data that has a relatively high priority requirement. For example, the priority requirement of MiCr data may be higher than the priority requirement of other data. Generally, priority refers to the importance or time-sensitivity of the data. Data having relatively higher importance and/or relatively greater time-sensitivity should be received before other data having relatively lesser importance and/or relatively lesser time-sensitivity. In some configurations, MiCr data refers to data that has a relatively high reliability requirement. For example, the reliability requirement of MiCr data may be greater than the reliability requirement of other data included in that subframe. Generally, reliability refers to how consistently data is successfully received by the intended destination without errors. Thus, the UE may assign the PC2/PC1.5 capable signal path to a first subscription that communicates data having a relatively higher priority and/or more stringent QoS requirements, while assigning a PC3 capable signal path to a second subscription with relatively lower priority and/or less stringent QoS requirements.

In yet another example, the UE, at the ninth step 518, may assign a signal path to each of the subscriptions based on a service type or application of each of the subscriptions. For example, if a first subscription is being used for a voice call using cell resources, and a second subscription is being used for a voice call using data resources (e.g., WLAN or WiFi), the UE may determine to assign the PC2/PC1.5 capable signal path to the first subscription because the voice call using cell resources (e.g., voice over new radio (VoNR)) may be more prone to path loss and interference, and typically, relatively larger distances between the UE and a BS providing cellular communications. In another example, the UE may determine to switch assignment of the PC2/PC1.5 capable signal path to the second subscription if the cellular voice call is put on hold, while the data voice call continues.

In yet another example, the UE, at the ninth step 518, may assign a signal path to each of the subscriptions based on both an uplink transmit power estimation, as well as a service type or application used by each of the subscriptions. In some configurations, the UE may estimate an uplink transmit power for each subscription, then determine whether a delta between the estimations is greater or less than a threshold value. For example, if the difference between the uplink transmit power for each subscription is less than 2 dBm, the UE may determine signal path assignment based on the service type or application used by each of the subscriptions. However, if the delta between the estimate uplink transmit power is less than a threshold value, then the UE may assign a PC2/PC1.5 capable signal path to both subscriptions, or the UE may assign the PC2/PC1.5 capable signal path to only the subscription that requires a higher uplink transmit power. The UE may assign a PC3 capable signal path to the remaining subscriptions.

Thus, the exemplary process 500 of FIG. 5 provides the UE with the ability to dynamically switch a signal path for a subscription based on communication parameters such as communication mode of a UE for a particular subscription, as well as radio conditions of a communication link for the subscription. Accordingly, the UE may dynamically switch a signal path from a higher level PC2/PC1.5 signal path to a lower level PC3 path if the UE switches from a connected mode to an idle or inactive mode for the subscription. As such, the higher level PC2/PC1.5 signal path may be reserved for a subscription that is able to use the higher power levels at a future time, or if the UE switches back to the connected mode and radio conditions permit the UE to use a higher uplink transmit power for the subscription.

Figure 6:
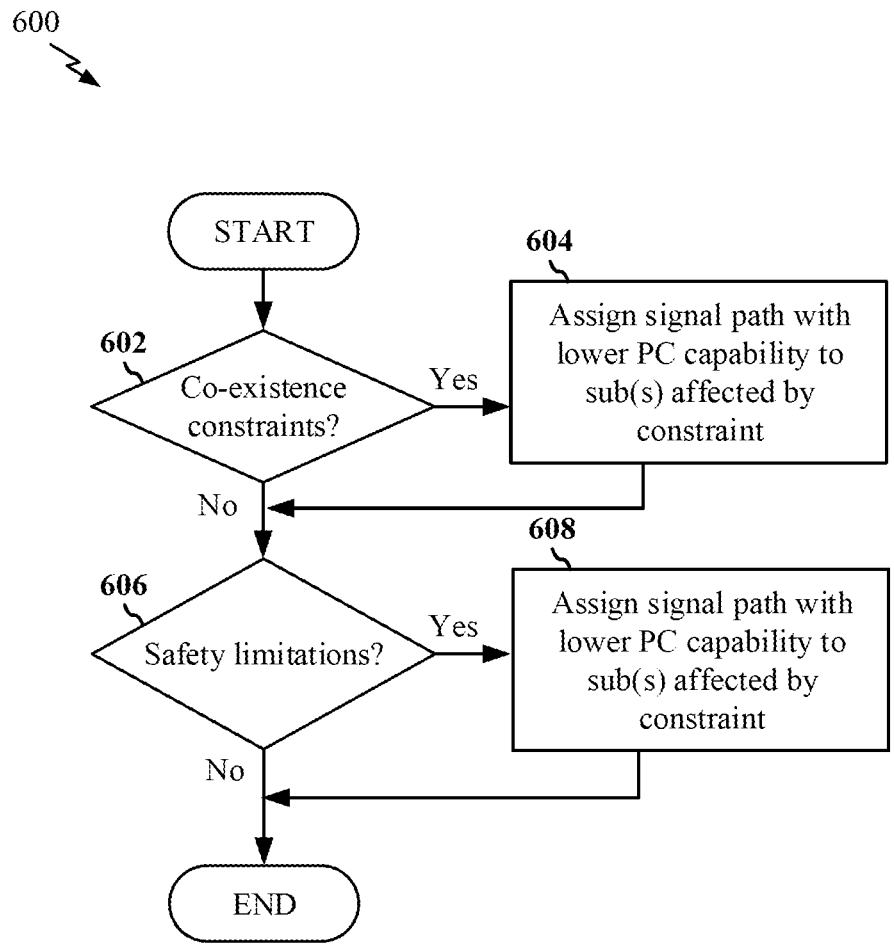
FIG. 6 is a flow chart illustrating an exemplary process for signal path assignment in accordance with some aspects of the present disclosure.

FIG. 6 is a flow chart illustrating an exemplary process 600 for signal path assignment in accordance with some aspects of the present disclosure. The process 600 may be performed by a UE (e.g., UE 104 of FIG. 1) configured with communication hardware that supports multiple signal paths for separate transmit and receive functions for each SIM. In the example, of FIG. 6, the UE may assign a signal path based on determined communication parameters for each subscription. Here, the communication parameters may include those discussed above in FIGS. 4 and 5, as well as other communication parameters such as a co-existence constraint, safety limitations, etc., described in more detail below.

At a first step 602, the UE may determine whether one or more of the subscriptions is constrained by a maximum transmit power level back-off or a transmit power limit due to a co-existence requirement. In certain aspects, communications of for subscription may interfere with communications for another subscription. Thus, maximum uplink transmit power for one or more of the subscriptions may be restricted to prevent or reduce the interference. For example, if a first subscription uses n78 operational band for communication between the UE and a first BS, and a second subscription uses WLAN or WiFi for communication between the UE and a second BS, a maximum transmit power for uplink transmissions for the first subscription may be limited/restricted to prevent interference and maintain a minimum performance level of communications for the second subscription.

At a second step 604, if co-existence restraints prevent the UE from transmitting uplink communications beyond a threshold (e.g., 25 dBm) on one or more of the subscriptions, the UE may assign a signal path with a lower PC capability (e.g., PC3) to the one or more of the subscriptions affected by the co-existence restraints if the restraints prevent the UE from using transmit power levels provided by a PC2/PC1.5 signal path. Otherwise, the UE may assign a PC2/PC1.5 signal path to one or more of the subscriptions based on the communication parameters described above in reference to FIGS. 4 and 5.

The UE may determine at a third step 606 (in addition to the first step 602 or as an alternative), whether the UE's maximum uplink transmit power is affected by any safety limitations, such as specific absorption rate (SAR) restrictions, or other maximum transmit power (MTPL) back-off requirements. For example, safety restrictions and/or other MTPL back-off requirements may limit the UE's cumulative transmit power if the UE is transmitting uplink communications for two subscriptions simultaneously. In another example, the safety limitations and/or other MTPL back-off requirements may limit the transmit power for each subscription individually. Thus, at a fourth step 608, the UE may assign a signal path with a lower PC capability (e.g., PC3) to the one or more of the subscriptions affected by the safety restrictions and/or other MTPL back-off requirements if the restraints prevent the UE from using transmit power levels provided by a PC2/PC1.5 signal path.

Thus, the exemplary process 600 of FIG. 6 provides the UE with the ability to dynamically switch a signal path for a subscription based on network and/or UE power requirements. Accordingly, the UE may dynamically switch a signal path from a higher level PC2/PC1.5 signal path to a lower level PC3 path if the UE is prevented from using the power levels provided by the higher level PC2/PC1.5 signal path. As such, the higher level PC2/PC1.5 signal path may be reserved for a subscription that is able to use the higher power levels at a future time.

It should be noted that the UE may use any combination of the above techniques, including those described in reference to FIGS. 4-6, to assign a signal path to one or more subscriptions. For example, the UE may weigh different criterion using different thresholds or based on various requirements, customer preference, and implementation.

In any of the examples described above and illustrated in FIGS. 4-6, the UE may notify one or more BSs associated with the multiple subscriptions of its dynamic signal path switching capability. The UE may also notify the one or more BSs if a respective signal path assignment has been changed (e.g., from a PC3 to a PC2/PC1.5 capable signal path, or vice versa).

Figure 7:
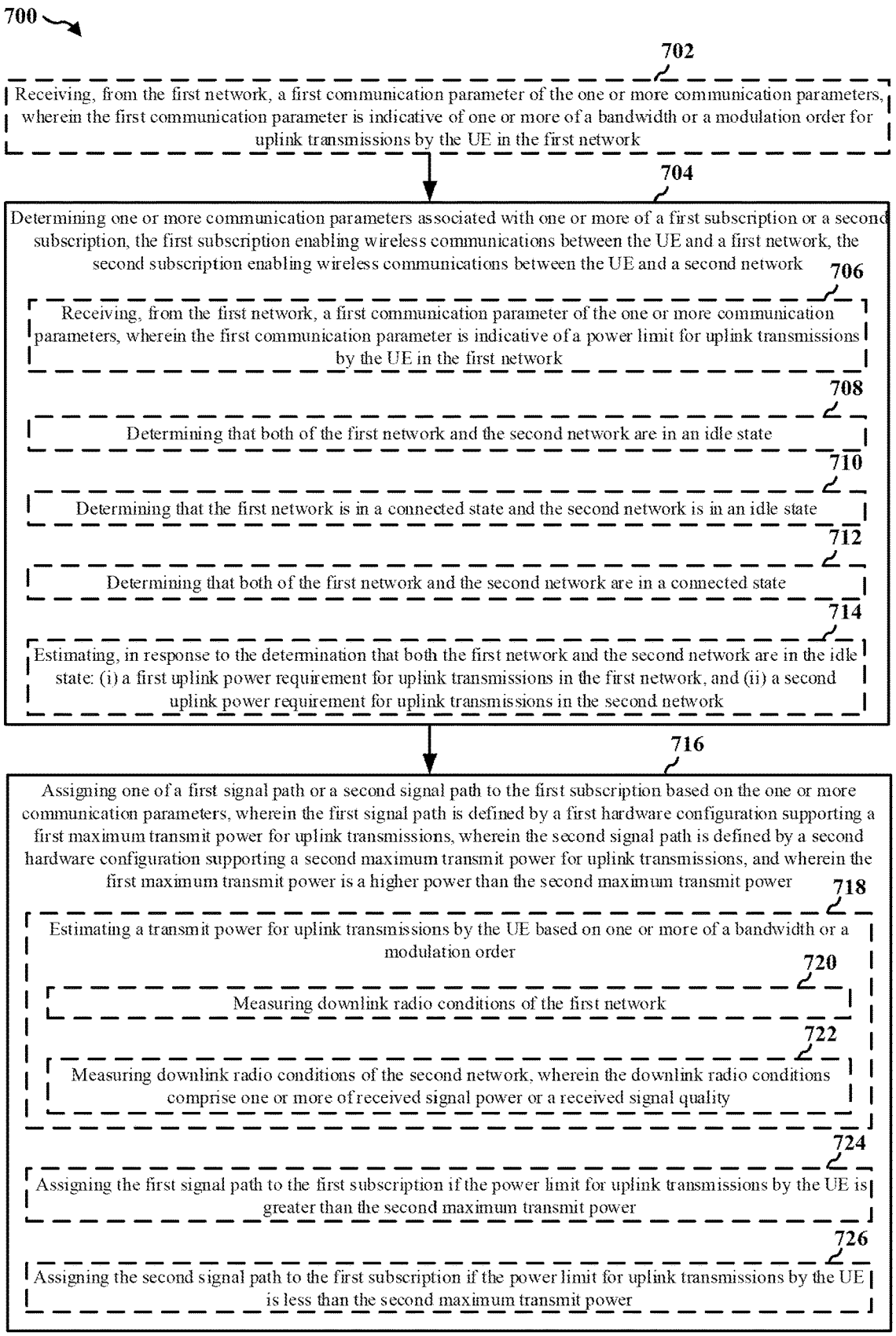
FIG. 7 is a flowchart of a method of wireless communication.

FIG. 7 is a flowchart 700 of a method of wireless communication. The method may be performed by a UE (e.g., UE 104 of FIGS. 1 and 3; apparatus 802 of FIG. 8).

At a first step 702, the UE may optionally receive, from the first network, a first communication parameter of the one or more communication parameters, wherein the first communication parameter is indicative of one or more of a bandwidth or a modulation order for uplink transmissions by the UE to the first network. Here, the first step 702 may be performed by a receiving component 844 of the apparatus 802 in FIG. 8.

At a second step 704, the UE may determine one or more communication parameters associated with one or more of a first subscription or a second subscription, the first subscription enabling wireless communications between the UE and a first network, the second subscription enabling wireless communications between the UE and a second network. Here, the second step 704 may be performed by a determining component 840 of the apparatus 802 in FIG. 8. For example, the UE may be configured as a dual-SIM dual active (DSDA) device, which provides the UE with simultaneous active connections with the networks corresponding to two subscriptions/SIMS using separate transmit/receive paths associated with each subscription. That is, the UE may include hardware (e.g., a radio frequency (RF) front end) configured to support multiple signal paths, with each signal path used by a particular one of the two subscriptions.

Optionally, in a third step 706, the UE may receive, from the first network, a first communication parameter of the one or more communication parameters, wherein the first communication parameter is indicative of a power limit for uplink transmissions by the UE to the first network. Here, the third step 706 may be performed by a receiving component 844 of the apparatus 802 in FIG. 8. For example, the UE may use communication parameters advertised by the one or more of a first BS and a second BS to determine which subscription would be an optimal assignment to the higher PC signal path. One or more of the first BS and the second BS may advertise (e.g., via one or more of a system information block (SIB), master information block (MIB), etc.) the communication parameters to the UE. In some examples, the advertised communication parameters may include specific information elements (IEs) that may limit the uplink transmit power that the UE is allowed to use for uplink transmission in the first network or the second network.

Optionally, in a fourth step 708, the UE may determining that both of the first network and the second network are in an idle state. Optionally, in a fifth step 710, the UE may determine that the first network is in a connected state and the second network is in an idle state. Optionally, in a sixth step 712, the UE may determining that both of the first network and the second network are in a connected state. Here, the fourth step 708, the fifth step 710, and the sixth step 712 may be performed by a determining component 840 of the apparatus 802 in FIG. 8.

Optionally, at a seventh step 714, the UE may estimate, in response to the determination that both the first network and the second network are in the idle state: (i) a first uplink power requirement for uplink transmissions in the first network, and (ii) a second uplink power requirement for uplink transmissions in the second network. Here, the seventh step 714 may be performed by an estimating component 846 of the apparatus 802 in FIG. 8.

At an eighth step 716, the UE may assign, by the UE, one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power. Here, the eighth step 716 may be performed by an assigning component 842 of the apparatus 802 in FIG. 8. For example, the UE hardware may have a plurality of signal paths that the UE may use for communicating wireless signaling with a BS. In the case of a UE configured for DSDA mode, the UE may use a first signal path for communication with a first BS for a first subscription, and the UE may use a second signal path for communication with a second BS for a second subscription. Each signal path may be configured to support a particular PC, which relates to a maximum transmit power over a particular channel bandwidth. For example, a UE may transmit uplink signaling using a PC3 signal path for uplink signaling that may be transmitted at a maximum uplink transmit power of 23 dBm. Alternatively, the UE may transmit uplink signaling using a PC2/PC1.5 signal path for uplink signaling transmitted at a maximum uplink transmit power of 26/29 dBm. Thus, based on communication parameters, the UE may select an appropriate signal path for communication for a first subscription based on a PC of the signal path.

Optionally, at a ninth step 718, the UE may estimate a transmit power for uplink transmissions by the UE based on one or more of a bandwidth or a modulation order. Here, the ninth step 718 may be performed by an estimating component 846 of the apparatus 802 in FIG. 8.

Optionally, at a tenth step 720, the UE may measure downlink radio conditions of the first network. Here, the tenth step 720 may be performed by a measuring component 848 of the apparatus 802 in FIG. 8.

Optionally, at an eleventh step 722, the UE may measure downlink radio conditions of the second network, wherein the downlink radio conditions comprise one or more of received signal power or a received signal quality. Here, the eleventh step 722 may be performed by a measuring component 848 of the apparatus 802 in FIG. 8.

Optionally, at a twelfth step 724, the UE may assign the first signal path to the first subscription if the power limit for uplink transmissions by the UE is greater than the second maximum transmit power. Here, the twelfth step 724 may be performed by an assigning component 842 of the apparatus 802 in FIG. 8. That is, the UE may assign a signal path that is configured for a higher power (e.g., PC2/PC1.5) to a subscription if the network for that subscription allows the UE to transmit uplink signaling using a transmit power that another signal path (e.g., a PC3 signal path) cannot provide.

Optionally, in a thirteenth step 726, the UE may assign the second signal path to the first subscription if the power limit for uplink transmissions by the UE is less than the second maximum transmit power. Here, the thirteenth step 726 may be performed by an assigning component 842 of the apparatus 802 in FIG. 8. In other words, if the network of a subscription sets a power limit that prevents the UE from taking advantage of the higher transmit power available to a PC2/PC1.5 signal path (e.g., relative to a PC3 signal path), then the UE may assign a PC3 signal path to that subscription because the UE will not be able to take advantage of the PC2/PC1.5 power levels. This reserves the PC2/PC1.5 signal path for another subscription.

In certain aspects, the method of wireless communication may include receiving, from the first network, a first communication parameter of the one or more communication parameters, wherein the first communication parameter is indicative of one or more of a bandwidth or a modulation order for uplink transmissions by the UE to the first network. For example, the UE may receive an IEs or control information indicating one or more of a bandwidth or a modulation order that the UE may use for uplink communications. The bandwidth and modulation order may limit the uplink transmit power of the UE, so accordingly, the UE may determine any such limitation based on the received a bandwidth or a modulation order, and assign a suitable signal path for the subscription based on the determination.

In certain aspects, assigning one of the first signal path or the second signal path to the first subscription based on the one or more communication parameters further comprises: assigning the first signal path to the first subscription if the power limit for uplink transmissions by the UE is greater than the second maximum transmit power; or assigning the second signal path to the first subscription if the power limit for uplink transmissions by the UE is less than the second maximum transmit power. For example, the UE may have the option of using two signal paths: a PC3 signal path, and a PC2/PC1.5 signal path that provides a higher transmit power relative to the PC3 signal path. Thus, if the network power limit for uplink transmissions by the UE is not greater than the power limit for a PC3 signal path, then the UE may assign a PC3 signal path for that network because the higher power capability of a PC2/PC1.5 signal path cannot be used with that network. Alternatively, if the network power limit for uplink transmissions by the UE is greater than the power limit for a PC3 signal path, then the UE may assign a PC2/PC1.5 signal path for that network because the higher power capability of a PC2/PC1.5 signal path can be used with that network.

In certain aspects, the method includes estimating a transmit power for uplink transmissions by the UE based on one or more of a bandwidth or a modulation order; and assigning the first signal path to the first subscription if the estimated transmit power for uplink transmissions by the UE is greater than the second maximum transmit power; or assigning the second signal path to the first subscription if the estimated transmit power for uplink transmissions by the UE is less than the second maximum transmit power. Similar to the above, if the network power limit (as determined based on the bandwidth and/or modulation order) for uplink transmissions by the UE is not greater than the power limit for a PC3 signal path, then the UE may assign a PC3 signal path for that network because the higher power capability of a PC2/PC1.5 signal path cannot be used with that network. Alternatively, if the network power limit for uplink transmissions by the UE is greater than the power limit for a PC3 signal path, then the UE may assign a PC2/PC1.5 signal path for that network because the higher power capability of a PC2/PC1.5 signal path can be used with that network.

In certain aspects, determining one or more communication parameters associated with one or more of a first subscription or a second subscription further comprises: determining that both of the first network and the second network are in an idle state; and estimating, in response to the determination that both the first network and the second network are in the idle state: (i) a first uplink power requirement for uplink transmissions in the first network, and (ii) a second uplink power requirement for uplink transmissions in the second network. For example, if both of the first subscription and the second subscription are in an idle or inactive state, the UE may estimate, based on downlink radio conditions, a suitable transmit power level for uplink communication in each subscription. If the estimated uplink power level is not greater than the power limit for a PC3 signal path, then the UE may assign a PC3 signal path for that network because the higher power capability of a PC2/PC1.5 signal path cannot be used with that network. Alternatively, if the estimated uplink power level is greater than the power limit for a PC3 signal path, then the UE may assign a PC2/PC1.5 signal path for that network because the higher power capability of a PC2/PC1.5 signal path can be used with the estimated uplink power level.

In certain aspects, the method includes assigning the first signal path to the first subscription if the estimated first uplink power requirement is greater than the second maximum transmit power; or assigning the second signal path to the first subscription if the estimated first uplink power requirement is less than the second maximum transmit power. For example, if the estimated uplink power level is not greater than the power limit for a PC3 signal path, then the UE may assign a PC3 signal path for that network because the higher power capability of a PC2/PC1.5 signal path cannot be used with that network. Alternatively, if the estimated uplink power level is greater than the power limit for a PC3 signal path, then the UE may assign a PC2/PC1.5 signal path for that network because the higher power capability of a PC2/PC1.5 signal path can be used with the estimated uplink power level.

In certain aspects, the method includes assigning the first signal path to the second subscription if the estimated second uplink power requirement is greater than the second maximum transmit power; or assigning the second signal path to the second subscription if the estimated second uplink power requirement is less than the second maximum transmit power. For example, if the estimated uplink power level is not greater than the power limit for a PC3 signal path, then the UE may assign a PC3 signal path for that network because the higher power capability of a PC2/PC1.5 signal path cannot be used with that network. Alternatively, if the estimated uplink power level is greater than the power limit for a PC3 signal path, then the UE may assign a PC2/PC1.5 signal path for that network because the higher power capability of a PC2/PC1.5 signal path can be used with the estimated uplink power level.

In certain aspects, estimating the first uplink power requirement comprises measuring downlink radio conditions of the first network; and estimating the second uplink power requirement comprises measuring downlink radio conditions of the second network, wherein the downlink radio conditions comprise one or more of received signal power or a received signal quality. For example, the UE may measure downlink conditions such as signal level (e.g., measured reference signal received power (RSRP)), signal quality (e.g., reference signal received quality (RSRQ)), and/or path loss based on any suitable signaling (e.g., a path-loss reference signal (PLRS), a synchronization signal block (SSB), a physical broadcast channel (PBCH), etc.). The UE may use the measured downlink conditions to estimate an expected transmit power for each subscription. If a subscription changes from idle mode to connected mode, the UE may determine a potential uplink transmit power requirement for communications over the subscription using the communication parameters described above in referenced to FIG. 4 to determine whether to assign a PC3 or PC2/PC1.5 capable signal path to the subscription.

In certain aspects, determining one or more communication parameters associated with one or more of a first subscription or a second subscription further comprises: determining that the first network is in a connected state and the second network is in an idle state; assigning, by the UE, the first signal path to the first subscription. For example, if the UE is operating with two subscriptions, and one of the subscriptions is idle and the other is active, the UE may assign a PC2/PC1.5 signal path to the active subscription to give the UE maximum range of uplink transmit power for the active subscription. Even if the UE is only configured with one PC2/PC1.5 signal path, the second subscription, being idle, is not in need of the PC2/PC1.5 signal path.

In certain aspects, determining one or more communication parameters associated with one or more of a first subscription or a second subscription further comprises determining that both of the first network and the second network are in a connected state, wherein the method further comprises: in response to the determination that both the first network and the second network are in the connected state: estimating (i) a first uplink power requirement for uplink transmissions in the first network, and (ii) a second uplink power requirement for uplink transmissions in the second network; and determining one or more of a priority or a quality of service associated with data communicated using each of the first subscription and the second subscription. For example, if both of the first network and the second network are in a connected state, then the UE will determine an optimal use of a PC2/PC1.5 signal path by determining which one of the first subscription and the second subscription will most benefit from the higher uplink transmit power. One way of making such a determination is by estimating an uplink power for the first network, and an uplink power for the second network. In some cases, the PC2/PC1.5 signal path may be assigned to the subscription corresponding to whichever network requires the higher uplink power.

In certain aspects, the method includes assigning the first signal path to the first subscription if the estimated first uplink power requirement is greater than the second maximum transmit power; or assigning the second signal path to the first subscription if the estimated first uplink power requirement is less than the second maximum transmit power. For example, the PC2/PC1.5 signal path may be assigned to the subscription corresponding to whichever network requires the higher uplink power. If there are more than one PC2/PC1.5 signal paths on the UE, then a PC2/PC1.5 signal path may be assigned to each of the first subscription and the second subscription. However, even if only one PC2/PC1.5 signal path exists on the UE, then the UE may determine if one or more of the first subscription and the second subscription can use a PC3 signal path instead.

In certain aspects, the method includes assigning the first signal path to the second subscription if the estimated second uplink power requirement is greater than the second maximum transmit power; or assigning the second signal path to the second subscription if the estimated second uplink power requirement is less than the second maximum transmit power. For example, the PC2/PC1.5 signal path may be assigned to the subscription corresponding to whichever network requires the higher uplink power. If there are more than one PC2/PC1.5 signal paths on the UE, then a PC2/PC1.5 signal path may be assigned to each of the first subscription and the second subscription. However, even if only one PC2/PC1.5 signal path exists on the UE, then the UE may determine if one or more of the first subscription and the second subscription can use a PC3 signal path instead.

In certain aspects, estimating the first uplink power requirement comprises measuring downlink radio conditions of the first network; and estimating the second uplink power requirement comprises measuring downlink radio conditions of the second network, wherein the downlink radio conditions comprise one or more of received signal power or a received signal quality. For example, the UE may measure downlink conditions such as signal level (e.g., measured RSRP), signal quality (e.g., measured RSRQ), and/or path loss based on any suitable signaling (e.g., a PLRS, an SSB, a PBCH, etc.). The UE may use the measured downlink conditions to estimate an expected transmit power for each subscription. If a subscription changes from idle mode to connected mode, the UE may determine a potential uplink transmit power requirement for communications over the subscription using the communication parameters described above in referenced to FIG. 4 to determine whether to assign a PC3 or PC2/PC1.5 capable signal path to the subscription.

In certain aspects, determining one or more communication parameters associated with one or more of a first subscription or a second subscription further comprises determining that both of the first network and the second network are in a connected state, wherein the method further comprises: in response to the determination that both the first network and the second network are in the connected state: estimating (i) a first uplink power requirement for uplink transmissions in the first network, and (ii) a second uplink power requirement for uplink transmissions in the second network; and determining one or more of a priority or a quality of service associated with data communicated using each of the first subscription and the second subscription. For example, if both of the networks corresponding to the subscriptions are in a connected state, then the UE may have to determine which of the subscriptions should be assigned the PC2/PC1.5 signal path. Here, the UE may determine which subscription will get the greatest benefit of the higher uplink transmit power afforded by the PC2/PC1.5 signal path by comparing estimated uplink transmission power required by each subscription, as well as comparing a priority or a quality of service associated with the data communicated over each corresponding network.

In certain aspects, determining a difference between the estimated first uplink power requirement and the estimated second uplink power requirement; if the difference between the estimated first uplink power requirement and the estimated second uplink power requirement is greater than a threshold value, assigning the first signal path to one of the first subscription or the second subscription corresponding to the greater of the estimated first uplink power requirement and the estimated second uplink power requirement; and if the difference between the estimated first uplink power requirement and the estimated second uplink power requirement is less than a threshold value, assigning the first signal path to one of the first subscription or the second subscription corresponding to data having a higher one or more of the priority or the quality of service relative to the other of the first subscription or the second subscription. For example, if networks associated with both subscriptions require a relatively high uplink transmit power, then the UE may determine which subscription should be assigned the PC2/PC1.5 signal path by considering the priority or quality of service associated with the data communicated over each corresponding network. If the data of one network requires a higher priority or quality of service, then the UE may assign the PC2/PC1.5 signal path to the subscriptions associated with that network. However, if the required uplink transmit power for each network is different, as measured by a threshold, then the UE may simply assign the PC2/PC1.5 signal path to the subscription with the network requiring the higher uplink transmit power.

In certain aspects, the one or more communication parameters comprise one or more of: a co-existence constraint associated with at least one of the first network and the second network; or a specific absorption rate (SAR) constraint associated with the UE. For example, the UE and/or the network associated with one or more of the subscriptions may require that the UE limit its uplink transmit power according to safety or other regulations. Accordingly, the UE may determine which subscription is assigned the PC2/PC1.5 signal path (if any) based on whether the subscriptions regulate the uplink transmissions to a point that a PC3 signal path can be used effectively by the UE for either subscription. If, despite the requirements, the UE can still transmit at a relatively high power on one of the subscriptions, the UE may assign the PC2/PC1.5 signal path to that subscription.

In certain aspects, the UE supports a dual subscription dual active (DSDA) mode, wherein communications between the UE and the first network are enabled by a first subscriber identity module (SIM), and wherein communications between the UE and the second network are enabled by a second SIM.

Figure 8:
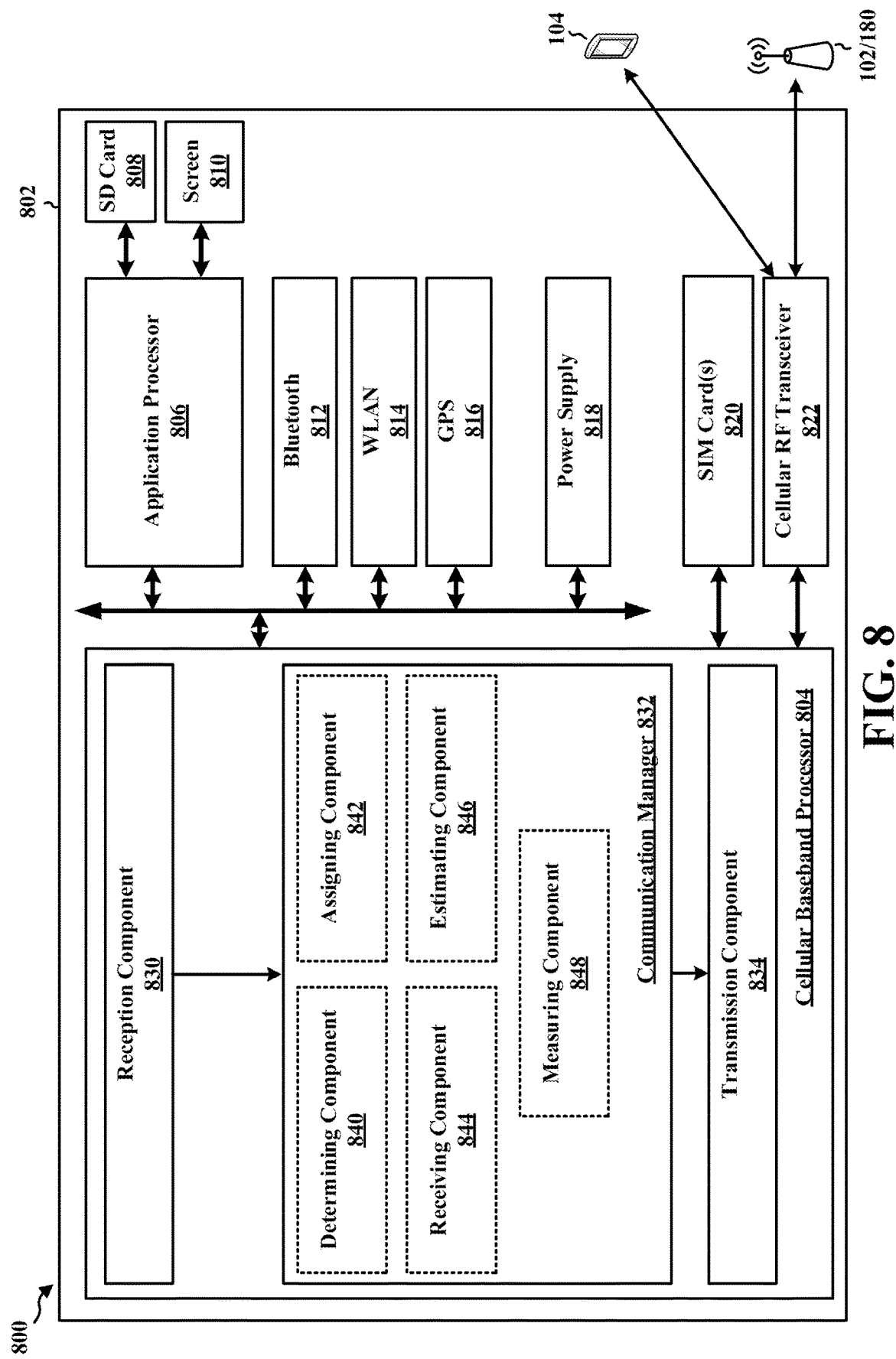
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 104 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see UE 104 of FIGS. 1 and 3) and include the aforementioned modules of the apparatus 802.

The communication manager 832 includes a determining component 840 that is configured to determine one or more communication parameters associated with one or more of a first subscription or a second subscription, the first subscription enabling wireless communications between the UE and a first network, the second subscription enabling wireless communications between the UE and a second network; determine that both of the first network and the second network are in an idle state; determining that the first network is in a connected state and the second network is in an idle state; determine that both of the first network and the second network are in a connected state; e.g., as described in connection with the second step 704, the fourth step 708, the fifth step 710, and the sixth step 712 of FIG. 7.

The communication manager 832 further includes an assigning component 842 configured to assign, by the UE, one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power; assign the first signal path to the first subscription if the power limit for uplink transmissions by the UE is greater than the second maximum transmit power; assign the second signal path to the first subscription if the power limit for uplink transmissions by the UE is less than the second maximum transmit power; e.g., as described in connection with the eighth step 716, the twelfth step 724, and the thirteenth step 726 of FIG. 7.

The communication manager 832 further includes a receiving component 844 that receives input in the form of a first communication parameter of the one or more communication parameters, wherein the first communication parameter is indicative of a power limit for uplink transmissions by the UE to the first network. The receiving component 844 may be configured to receive, from the first network, a first communication parameter of the one or more communication parameters, wherein the first communication parameter is indicative of one or more of a bandwidth or a modulation order for uplink transmissions by the UE to the first network; receive, from the first network, a first communication parameter of the one or more communication parameters, wherein the first communication parameter is indicative of a power limit for uplink transmissions by the UE to the first network; e.g., as described in connection with the first step 702 and the third step 706 of FIG. 7.

The communication manager 832 further includes an estimating component 846 for estimating a transmit power for uplink transmissions by the UE based on one or more of a bandwidth or a modulation order; estimating, in response to the determination that both the first network and the second network are in the idle state: (i) a first uplink power requirement for uplink transmissions in the first network, and (ii) a second uplink power requirement for uplink transmissions in the second network; estimating the first uplink power requirement comprises measuring downlink radio conditions of the first network; estimating the second uplink power requirement comprises measuring downlink radio conditions of the second network, wherein the downlink radio conditions comprise one or more of received signal power or a received signal quality; estimating a transmit power for uplink transmissions by the UE based on one or more of a bandwidth or a modulation order; and estimating (i) a first uplink power requirement for uplink transmissions in the first network, and (ii) a second uplink power requirement for uplink transmissions in the second network; e.g., as described in connection with the seventh step 714 and the ninth step 718 of FIG. 7.

The communication manager 832 further includes a measuring component 848 for measuring downlink radio conditions of the first network; measuring downlink radio conditions of the second network, wherein the downlink radio conditions comprise one or more of received signal power or a received signal quality; e.g., as described in connection with the tenth step 720 and the eleventh step 722 of FIG. 7.

The apparatus may include additional components that perform each of the blocks of the algorithm in the aforementioned flowcharts and of FIGS. 5-7. As such, each block in the aforementioned flowcharts of FIGS. 5-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining one or more communication parameters associated with one or more of a first subscription or a second subscription, the first subscription enabling wireless communications between the UE and a first network, the second subscription enabling wireless communications between the UE and a second network. The apparatus 802 may also include means for assigning, by the UE, one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power.

The aforementioned means may be one or more of the aforementioned components of the apparatus 802 configured to perform the functions recited by the aforementioned means. As described supra, the apparatus 802 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1: a method of wireless communication at a user equipment (UE), comprising: determining one or more communication parameters associated with one or more of a first subscription or a second subscription, the first subscription enabling wireless communications between the UE and a first network, the second subscription enabling wireless communications between the UE and a second network; and assigning one of a first signal path or a second signal path to the first subscription based on the one or more communication parameters, wherein the first signal path is defined by a first hardware configuration supporting a first maximum transmit power for uplink transmissions, wherein the second signal path is defined by a second hardware configuration supporting a second maximum transmit power for uplink transmissions, and wherein the first maximum transmit power is a higher power than the second maximum transmit power.

Example 2: The method of example 1, further comprising receiving, from the first network, a first communication parameter of the one or more communication parameters, wherein the first communication parameter is indicative of a power limit for uplink transmissions by the UE to the first network.

Example 3: The method of example 2, wherein assigning one of the first signal path or the second signal path to the first subscription based on the one or more communication parameters further comprises: assigning the first signal path to the first subscription if the power limit for uplink transmissions by the UE is greater than the second maximum transmit power; or assigning the second signal path to the first subscription if the power limit for uplink transmissions by the UE is less than the second maximum transmit power.

Example 4: The method of any of examples 1-3, further comprising receiving, from the first network, a first communication parameter of the one or more communication parameters, wherein the first communication parameter is indicative of one or more of a bandwidth or a modulation order for uplink transmissions by the UE to the first network.

Example 5: The method of example 4, further comprising: estimating a transmit power for uplink transmissions by the UE based on one or more of a bandwidth or a modulation order; and assigning the first signal path to the first subscription if the estimated transmit power for uplink transmissions by the UE is greater than the second maximum transmit power; or assigning the second signal path to the first subscription if the estimated transmit power for uplink transmissions by the UE is less than the second maximum transmit power.

Example 6: The method of any of examples claim 1-5, wherein determining one or more communication parameters associated with one or more of a first subscription or a second subscription further comprises: determining that both of the first network and the second network are in an idle state; and estimating, in response to the determination that both the first network and the second network are in the idle state: (i) a first uplink power requirement for uplink transmissions in the first network, and (ii) a second uplink power requirement for uplink transmissions in the second network.

Example 7: The method of example 6, further comprising: assigning the first signal path to the first subscription if the estimated first uplink power requirement is greater than the second maximum transmit power; or assigning the second signal path to the first subscription if the estimated first uplink power requirement is less than the second maximum transmit power.

Example 8: The method of example 7, further comprising: assigning the first signal path to the second subscription if the estimated second uplink power requirement is greater than the second maximum transmit power; or assigning the second signal path to the second subscription if the estimated second uplink power requirement is less than the second maximum transmit power.

Example 9: The method of any of examples 1-8, wherein: estimating the first uplink power requirement comprises measuring downlink radio conditions of the first network; and estimating the second uplink power requirement comprises measuring downlink radio conditions of the second network, wherein the downlink radio conditions comprise one or more of received signal power or a received signal quality.

Example 10: The method of any of examples 1-9, wherein determining one or more communication parameters associated with one or more of a first subscription or a second subscription further comprises: determining that the first network is in a connected state and the second network is in an idle state; and assigning the first signal path to the first subscription.

Example 11: The method of any of examples 1-10, wherein determining one or more communication parameters associated with one or more of a first subscription or a second subscription further comprises determining that both of the first network and the second network are in a connected state, wherein the method further comprises:
in response to the determination that both the first network and the second network are in the connected state: estimating (i) a first uplink power requirement for uplink transmissions in the first network, and (ii) a second uplink power requirement for uplink transmissions in the second network; and determining one or more of a priority or a quality of service associated with data communicated using each of the first subscription and the second subscription.

Example 12: The method of any of examples 1-11, further comprising: determining a difference between the estimated first uplink power requirement and the estimated second uplink power requirement; if the difference between the estimated first uplink power requirement and the estimated second uplink power requirement is greater than a threshold value, assigning the first signal path to one of the first subscription or the second subscription corresponding to the greater of the estimated first uplink power requirement and the estimated second uplink power requirement; and if the difference between the estimated first uplink power requirement and the estimated second uplink power requirement is less than a threshold value, assigning the first signal path to one of the first subscription or the second subscription corresponding to data having a higher one or more of the priority or the quality of service relative to the other of the first subscription or the second subscription.

Example 13: The method of any of examples 1-12, wherein the one or more communication parameters comprise one or more of: a co-existence constraint associated with at least one of the first network and the second network; a safety constraint associated with the UE; or a specific absorption rate (SAR) constraint associated with the UE.

Example 14: The method of any of examples 1-13, wherein the UE supports a dual subscription dual active (DSDA) mode, wherein communications between the UE and the first network are enabled by a first subscriber identity module (SIM), and wherein communications between the UE and the second network are enabled by a second SIM.

Example 15: A user equipment (UE) comprising: a memory; and a processor coupled to the memory, the processor and memory being configured to perform the method of any of claims 1-14.

Example 16: A user equipment (UE) comprising: one or more means for performing the method of any of claims 1-14.

Example 17: A non-transitory computer-readable storage medium having instructions stored thereon for performing the method of any of claims 1-14 for wireless communication by a user equipment (UE).

What is claimed is:

1. A method of wireless communication at a user equipment (UE), comprising:
   determining one or more communication parameters associated with one or more of a first subscription associated with a first subscription identity module (SIM) or a second subscription associated with a second SIM, the first subscription enabling wireless communications between the UE and a first network, the second subscription enabling wireless communications between the UE and a second network;
   estimating a transmit power or a power requirement for uplink transmission by the UE based on the one or more communication parameters; and
   assigning one of a first signal path or a second signal path to the first subscription based on the estimated transmit power or power requirement, wherein the first signal path is associated with a first hardware configuration supporting a first maximum transmit power for uplink transmissions, wherein the second signal path is associated with a second hardware configuration supporting a second maximum transmit power for uplink transmissions, and wherein the first maximum transmit power is a higher power than the second maximum transmit power.

2. The method of claim 1, further comprising receiving, from the first network, a first communication parameter of the one or more communication parameters, wherein the first communication parameter is indicative of one or more of a bandwidth or a modulation order for uplink transmissions by the UE to the first network.

3. The method of claim 2, further comprising:
estimating the transmit power for uplink transmissions by the UE based on one or more of the bandwidth or the modulation order; and
assigning the first signal path to the first subscription if the estimated transmit power for uplink transmissions by the UE is greater than the second maximum transmit power; or
assigning the second signal path to the first subscription if the estimated transmit power for uplink transmissions by the UE is less than the second maximum transmit power.

4. The method of claim 1, wherein determining one or more communication parameter associated with one or more of the first subscription or the second subscription further comprises:
determining that both of the first network and the second network are in an idle state; and
estimating, in response to the determination that both the first network and the second network are in the idle state: (i) a first uplink power requirement for uplink transmissions in the first network, and (ii) a second uplink power requirement for uplink transmissions in the second network.

5. The method of claim 4, further comprising:
assigning the first signal path to the first subscription if the estimated first uplink power requirement is greater than the second maximum transmit power; or
assigning the second signal path to the first subscription if the estimated first uplink power requirement is less than the second maximum transmit power.

6. The method of claim 4, further comprising:
assigning the first signal path to the second subscription if the estimated second uplink power requirement is greater than the second maximum transmit power; or
assigning the second signal path to the second subscription if the estimated second uplink power requirement is less than the second maximum transmit power.

7. The method of claim 4, wherein:
estimating the first uplink power requirement comprises measuring downlink radio conditions of the first network; and
estimating the second uplink power requirement comprises measuring downlink radio conditions of the second network, wherein the downlink radio conditions comprise one or more of received signal power or a received signal quality.

8. The method of claim 1, wherein determining one or more communication parameter associated with one or more of the first subscription or the second subscription further comprises:
determining that the first network is in a connected state and the second network is in an idle state; and
assigning the first signal path to the first subscription.

9. The method of claim 1, wherein determining one or more communication parameters associated with one or more of the first subscription or the second subscription further comprises determining that both of the first network and the second network are in a connected state, wherein the method further comprises:
in response to the determination that both the first network and the second network are in the connected state:
estimating (i) a first uplink power requirement for uplink transmissions in the first network, and (ii) a second uplink power requirement for uplink transmissions in the second network; and
determining one or more of a priority or a quality of service associated with data communicated using each of the first subscription and the second subscription.

10. The method of claim 9, further comprising:
determining a difference between the estimated first uplink power requirement and the estimated second uplink power requirement;
if the difference between the estimated first uplink power requirement and the estimated second uplink power requirement is greater than a threshold value, assigning the first signal path to one of the first subscription or the second subscription corresponding to the greater of the estimated first uplink power requirement and the estimated second uplink power requirement; and
if the difference between the estimated first uplink power requirement and the estimated second uplink power requirement is less than a threshold value, assigning the first signal path to one of the first subscription or the second subscription corresponding to data having a higher one or more of the priority or the quality of service relative to the other of the first subscription or the second subscription.

11. The method of claim 1, wherein the one or more communication parameters comprise one or more of:
a co-existence constraint associated with at least one of the first network and the second network;
a safety constraint associated with the UE; or
a specific absorption rate (SAR) constraint associated with the UE.

12. The method of claim 1, wherein the UE supports a dual subscription dual active (DSDA) mode, wherein communications between the UE and the first network are enabled by a first subscriber identity module (SIM), and wherein communications between the UE and the second network are enabled by a second SIM.

13. The method of claim 1, wherein the transmit power is a first transmit power estimated based at least in part on a first communication parameter associated with the first subscription, and wherein the method further comprises:
estimating a second transmit power based at least in part on a second communication parameter associated with the second subscription, wherein the first signal path is assigned to the first subscription based further on: (i) the first transmit power being a higher power than the second transmit power, and (ii) the first maximum transmit power being a higher power than the second maximum transmit power.

14. An apparatus for wireless communications, comprising:
a memory comprising instructions; and
one or more processors configured to execute the instructions and cause the apparatus to:
determine one or more communication parameters associated with one or more of a first subscription associated with a first subscription identity module (SIM) or a second subscription associated with a second SIM, the first subscription enabling wireless communications between the apparatus and a first network, the second subscription enabling wireless communications between the apparatus and a second network;
estimate a transmit power or a power requirement for uplink transmission by the apparatus based on the one or more communication parameters; and
assign one of a first signal path or a second signal path to the first subscription based on the estimated transmit power or power requirement, wherein the first signal path is associated with a first hardware configuration supporting a first maximum transmit power for uplink transmissions, wherein the second signal path is associated with a second hardware configuration supporting a second maximum transmit power for uplink transmissions, and wherein the first maximum transmit power is a higher power than the second maximum transmit power.

15. The apparatus of claim 14, wherein the one or more processors are further configured to cause the apparatus to receive, from the first network, a first communication parameter of the one or more communication parameters, wherein the first communication parameter is indicative of one or more of a bandwidth or a modulation order for uplink transmissions by the apparatus in the first network.

16. The apparatus of claim 15, wherein the one or more processors are further configured to cause the apparatus to:
estimate the transmit power for uplink transmissions by the apparatus based on one or more of a bandwidth or a modulation order; and
assign the first signal path to the first subscription if the estimated transmit power for uplink transmissions by the apparatus is greater than the second maximum transmit power; or
assigning the second signal path to the first subscription if the estimated transmit power for uplink transmissions by the apparatus is less than the second maximum transmit power.

17. The apparatus of claim 14, wherein the one or more processors, being configured to determine one or more communication parameter associated with one or more of the first subscription or the second subscription, are further configured to:
determine that both of the first network and the second network are in an idle state; and
estimate, in response to the determination that both the first network and the second network are in the idle state: (i) a first uplink power requirement for uplink transmissions in the first network, and (ii) a second uplink power requirement for uplink transmissions in the second network.

18. The apparatus of claim 17, wherein the one or more processors are further configured to cause the apparatus to:
assign the first signal path to the first subscription if the estimated first uplink power requirement is greater than the second maximum transmit power; or
assign the second signal path to the first subscription if the estimated first uplink power requirement is less than the second maximum transmit power.

19. The apparatus of claim 17, wherein the one or more processors are further configured to cause the apparatus to:
assign the first signal path to the second subscription if the estimated second uplink power requirement is greater than the second maximum transmit power; or
assign the second signal path to the second subscription if the estimated second uplink power requirement is less than the second maximum transmit power.

20. The apparatus of claim 17, wherein the one or more processors, being configured to estimate the first uplink power requirement, are further configured to measure downlink radio conditions of the first network.

21. The apparatus of claim 20, wherein the one or more processors, being configured to estimate the second uplink power requirement, are further configured to measure downlink radio conditions of the second network, wherein the downlink radio conditions comprise one or more of received signal power or a received signal quality.

22. The apparatus of claim 14, wherein the one or more processors, being configured to determine one or more communication parameter associated with one or more of the first subscription or the second subscription, are further configured to:
determine that the first network is in a connected state and the second network is in an idle state; and
assign the first signal path to the first subscription.

23. The apparatus of claim 14, wherein the one or more processors, being configured to determine one or more communication parameters associated with one or more of the first subscription or the second subscription, are further configured to determine that both of the first network and the second network are in a connected state, and wherein the one or processors are further configured to cause the apparatus to:
in response to the determination that both the first network and the second network are in the connected state:
estimate (i) a first uplink power requirement for uplink transmissions in the first network, and (ii) a second uplink power requirement for uplink transmissions in the second network; and
determine one or more of a priority or a quality of service associated with data communicated using each of the first subscription and the second subscription.

24. The apparatus of claim 23, wherein the one or more processors are further configured to cause the apparatus to:
determine a difference between the estimated first uplink power requirement and the estimated second uplink power requirement;
if the difference between the estimated first uplink power requirement and the estimated second uplink power requirement is greater than a threshold value, assign the first signal path to one of the first subscription or the second subscription corresponding to the greater of the estimated first uplink power requirement and the estimated second uplink power requirement; and
if the difference between the estimated first uplink power requirement and the estimated second uplink power requirement is less than a threshold value, assign the first signal path to one of the first subscription or the second subscription corresponding to data having a higher one or more of the priority or the quality of service relative to the other of the first subscription or the second subscription.

25. The apparatus of claim 14, wherein the one or more communication parameters comprise one or more of:
a co-existence constraint associated with at least one of the first network and the second network;
a safety constraint associated with the apparatus; or
a specific absorption rate (SAR) constraint associated with the apparatus; and
wherein the apparatus supports a dual subscription dual active (DSDA) mode, wherein communications between the apparatus and the first network are enabled by a first subscriber identity module (SIM), and wherein communications between the apparatus and the second network are enabled by a second SIM.

26. An apparatus for wireless communications, comprising:
- means for determining one or more communication parameters associated with one or more of a first subscription associated with a first subscription identity module (SIM) or a second subscription associated with a second SIM, the first subscription enabling wireless communications between the apparatus and a first network, the second subscription enabling wireless communications between the apparatus and a second network;
- means for estimating a transmit power or a power requirement for uplink transmission by the apparatus based on the one or more communication parameters; and
- means for assigning one of a first signal path or a second signal path to the first subscription based on the estimated transmit power or power requirement, wherein the first signal path is associated with a first hardware configuration supporting a first maximum transmit power for uplink transmissions, wherein the second signal path is associated with a second hardware configuration supporting a second maximum transmit power for uplink transmissions, and wherein the first maximum transmit power is a higher power than the second maximum transmit power.

27. A non-transitory computer-readable medium having instructions stored thereon that, when executed by a user equipment (UE), cause the UE to perform operations comprising:
- determining one or more communication parameters associated with one or more of a first subscription associated with a first subscription identity module (SIM) or a second subscription associated with a second SIM, the first subscription enabling wireless communications between the UE and a first network, the second subscription enabling wireless communications between the UE and a second network;
- estimating a transmit power or a power requirement for uplink transmission by the UE based on the one or more communication parameters; and
- assigning one of a first signal path or a second signal path to the first subscription based on the estimated transmit power or power requirement, wherein the first signal path is associated with a first hardware configuration supporting a first maximum transmit power for uplink transmissions, wherein the second signal path is associated with a second hardware configuration supporting a second maximum transmit power for uplink transmissions, and wherein the first maximum transmit power is a higher power than the second maximum transmit power.

* * * * *